US010687012B2

(12) United States Patent
Gilson et al.

(10) Patent No.: US 10,687,012 B2
(45) Date of Patent: *Jun. 16, 2020

(54) REMOTE CONTROL ACTIVATION BASED ON PREDICTED EVENTS

(71) Applicant: Comcast Cable Communications, LLC, Philadelphia, PA (US)

(72) Inventors: Ross Gilson, Philadelphia, PA (US); Michael Sallas, Radnor, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/404,158

(22) Filed: May 6, 2019

(65) Prior Publication Data
US 2019/0260957 A1 Aug. 22, 2019

Related U.S. Application Data

(63) Continuation of application No. 15/840,488, filed on Dec. 13, 2017, now Pat. No. 10,284,805, which is a
(Continued)

(51) Int. Cl.
H04N 5/44 (2011.01)
H04N 21/41 (2011.01)
(Continued)

(52) U.S. Cl.
CPC ....... H04N 5/4403 (2013.01); H04N 21/4126 (2013.01); H04N 21/42203 (2013.01);
(Continued)

(58) Field of Classification Search
CPC ............. H04N 5/4403; H04N 21/4126; H04N 21/42203; H04N 21/42207;
(Continued)

(56) References Cited

U.S. PATENT DOCUMENTS 5,511,000 A 4/1996 Kaloi et al.
6,278,499 B1 * 8/2001 Darbee .................. G06F 3/147
348/734
(Continued)

FOREIGN PATENT DOCUMENTS

GB 2263182 A 7/1993
JP H02305070 A 12/1990

OTHER PUBLICATIONS

Docsis, Wikipedia, en.wikipedia.org/wiki/Docsis, printed Feb. 26, 2013, pp. 1-5.
(Continued)

Primary Examiner — Kerri L McNally
(74) Attorney, Agent, or Firm — Banner & Witcoff, Ltd.

(57) ABSTRACT

Systems and methods for predicting trigger events, such as an advertisement during a video program, and activating a remote control device in response to the prediction are described. By activating the remote control device at a particular time, the remote control device may save energy when listening for data from one or more terminal devices. The time to activate the remote control may be based on one or more factors, including the current presentation position and/or presentation speed of the video program. A remote control device may take additional actions the next time it listens for data, including illuminating backlights, turning on a display, displaying content on the display, interacting with other devices, etc.

20 Claims, 6 Drawing Sheets

Related U.S. Application Data continuation of application No. 15/055,923, filed on Feb. 29, 2016, now Pat. No. 9,883,132, which is a continuation of application No. 13/804,559, filed on Mar. 14, 2013, now Pat. No. 9,313,440.

(51) Int. Cl.
| | | |
|---|---|---|
| *H04N 21/422* | (2011.01) | |
| *H04N 21/44* | (2011.01) | |
| *H04N 21/443* | (2011.01) | |
| *H04N 21/81* | (2011.01) | |

(52) U.S. Cl.
CPC . *H04N 21/42207* (2013.01); *H04N 21/42209* (2013.01); *H04N 21/42222* (2013.01); *H04N 21/44008* (2013.01); *H04N 21/4436* (2013.01); *H04N 21/812* (2013.01); *H04N 2005/441* (2013.01); *H04N 2005/4432* (2013.01); *H04N 2005/4444* (2013.01)

(58) Field of Classification Search
CPC ....... H04N 21/42209; H04N 21/42222; H04N 21/44008; H04N 21/4436; H04N 21/812
USPC ...................................... 340/12.54
See application file for complete search history.

(56) References Cited

U.S. PATENT DOCUMENTS

| | | | |
|---|---|---|---|
| 6,397,186 B1 | 5/2002 | Bush | |
| 6,903,655 B2 | 6/2005 | Stefanik | |
| 7,154,428 B2 | 12/2006 | de Clercq et al. | |
| 7,394,782 B2 | 7/2008 | Davis | |
| 7,546,120 B1 | 6/2009 | Ulvenes | |
| 7,928,705 B2 | 4/2011 | Hooijschuur et al. | |
| 8,560,875 B2 | 10/2013 | Shen | |
| 8,855,470 B2 | 10/2014 | Stern et al. | |
| 9,313,440 B2 | 4/2016 | Gilson et al. | |
| 9,883,132 B2 * | 1/2018 | Gilson | ................ H04N 5/4403 |
| 2004/0268413 A1 | 12/2004 | Reid et al. | |
| 2005/0110909 A1 * | 5/2005 | Staunton | ............... H04N 5/4401 348/734 |
| 2005/0120096 A1 | 6/2005 | Rekimoto et al. | |
| 2005/0188246 A1 | 8/2005 | Emberty et al. | |
| 2007/0014264 A1 | 1/2007 | Davis | |
| 2007/0185968 A1 | 8/2007 | White et al. | |
| 2007/0260905 A1 * | 11/2007 | Marsden | ................ G06F 1/3215 713/323 |
| 2008/0298770 A1 | 12/2008 | Noguchi | |
| 2009/0230934 A1 | 9/2009 | Hooijschuur et al. | |
| 2009/0320056 A1 | 12/2009 | Wu et al. | |
| 2010/0013551 A1 * | 1/2010 | Reams | ................. H04N 5/4403 327/544 |
| 2010/0165898 A1 * | 7/2010 | Tang | ................ H04W 52/0235 370/311 |
| 2013/0332287 A1 * | 12/2013 | Kuo | ................... G06Q 30/0207 705/14.68 |

OTHER PUBLICATIONS

GreenPeak Technologies, "Ultra Low Power Wireless Control Networks," www.greenpeak.com/Technology/Technology.html, printed Jan. 23, 2013, p. 1.

HomePlug, Wikipedia, en.wikipedia.org/wiki/HomePlug, printed Feb. 26, 2013, pp. 1-7.

MoCA: Multimedia over Coax Alliance, "The standard for Home Entertainment Networking," www.mocalliance.org, printed Feb. 26, 2013, pp. 1-2.

Power line communication, Wikipedia, en.wikipedia.org/wiki/Power_line_communication, printed Feb. 26, 2013, pp. 1-9.

ZigBee Alliance, ZigBee RF4CE Overview, printed Jan. 23, 2013, © 2013 ZigBee Alliance, p. 1.

* cited by examiner

REMOTE CONTROL ACTIVATION BASED ON PREDICTED EVENTS

CROSS-REFERENCE TO RELATED APPLICATIONS

This application is a continuation of pending U.S. patent application Ser. No. 15/840,488, filed Dec. 13, 2017, and entitled REMOTE CONTROL ACTIVATION BASED PREDICTED EVENTS, which is a continuation of U.S. patent application Ser. No. 15/055,923, filed Feb. 29, 2016, and entitled REMOTE CONTROL ACTIVATION BASED ON PREDICTED EVENTS (now U.S. Pat. No. 9,883,132), which is a continuation of U.S. patent application Ser. No. 13/804,559, filed Mar. 14, 2013, and entitled REMOTE CONTROL ACTIVATION BASED ON PREDICTED EVENTS (now U.S. Pat. No. 9,313,440). The prior applications are hereby incorporated by reference in their entirety.

BACKGROUND

Portable television remote controls are typically powered by batteries with limited life spans. Some remote controls can receive information from external devices, such as televisions or set-top boxes. In order to save battery life, remote controls can poll for information from external devices at predefined times. For example, a remote control might only listen for information only immediately after the user has used the remote control to send a command. One problem with this solution is that external devices may desire to send information to the remote control even when the remote control is not being used by the user. Another solution is for the remote control to listen for information at predefined intervals (e.g., every 5 minutes, 20 minutes). If the predefined interval is too short, however, the remote control battery may drain too quickly. If the predefined interval is too long, the remote control may miss information transmitted by external devices or receive information that is too old if the external device buffers the information until the remote polls it.

SUMMARY

This summary is not intended to identify critical or essential features of the disclosures herein, but instead merely summarizes certain features and variations thereof. Other details and features will also be described in the sections that follow.

In one aspect, provided is a system that improves the lifespan of a remote control device's power source (such as a battery) by more efficiently listening for data from terminal devices based on predictions of trigger events, such as the start of a commercial. Some of the various features described herein relate to a method of activating a remote control device based on predicted events, such as the start of a commercial and/or a system, computer readable medium, and/or apparatus configured to perform the method.

A method described herein may comprise identifying a content item, such as a television program, being presented by a device, such as a terminal device. A computing device may determine a time for a remote control device (e.g., a television remote control, mobile phone, etc.), which may be configured to operate with the terminal device, to transition from a standby state to an active state. During the active state, the remote control device may be configured to listen for data from the terminal device. The determining may be based in part on an estimate of a presentation time of a trigger event occurring during presentation of the content item, which may comprise the time of a commercial and/or a start time of a television commercial presented during presentation of the television program. The method may further comprise transmitting, to the remote control device, identification of the determined time for the remote control device to transition from the standby state to the active state.

In some aspects, determining the time for the remote control device to transition from the standby state to the active state may be based on a current presentation time of the content item and the estimate of the presentation time of the trigger event. Furthermore, the content item may comprise an episode of a television program, and the estimate of the presentation time of the trigger event may be based on the time of a trigger event occurring in at least one previous episode of the television program. Additionally or alternatively, determining the time for the remote control device to transition from the standby state to the active state may further be based on a current presentation speed of the content item being presented by the terminal device.

Various actions may be taken by the terminal device, remote control device, or other computing device at the determined time for the remote control device to transition from the standby state to the active state. For example, a command to illuminate a backlight of the remote control device may be transmitted to the remote control device. The presentation time of the trigger event may comprise the start time of an advertisement and/or commercial presented during presentation of the content item. The content item may comprise a video program. At the determined time for the remote control device to transition from the standby state to the active state, advertisement data that supplements the presented advertisement may be transmitted to the remote control device. Additionally or alternatively, it may be determined whether presentation of the commercial has started at the determined time for the remote control device to transition from the standby state to the active state. If the presentation of the commercial has started, data for generating a second commercial on a display of the remote control device may be transmitted to the remote control device. If the presentation of the commercial has not started, a second time for the remote control device to transition from the standby state to the active state based on a new estimate of the presentation time of the commercial may be determined.

A method described herein may comprise receiving, at a communication device (e.g., a two-way communication device), identification of a time for the communication device to transition from a standby state to an active state. The communication device may be configured to listen for data from a terminal device during the active state. The communication device may store the identification of the time to transition from the standby state to the active state. At the identified time, the communication device may transition from the standby state to the active state, and after transitioning to the active state, the communication device may listen for data from the terminal device. The communication device may be configured to transmit a request for data to the terminal device prior to listening for data from the terminal device during the active state.

In some aspects, the communication device may comprise at least one of a device configured to function as a television remote control and a mobile phone configured to control presentation of content on the terminal device. A backlight of the communication device may be illuminated at the identified time. Additionally or alternatively, the device may receive supplemental data from the terminal device while listening for data from the terminal device, and the supplemental data may be displayed on a display of the communication device. The supplemental data may correspond to an advertisement presented on a display of the terminal device.

In some aspects, prior to receiving identification of the time for the communication device to transition from the standby state to the active state (the second time), the communication device may have previously transitioned from the standby state to the active state (the first time). Furthermore, the receiving of the identification of the time may occur while the communication device is in the active state the first time. After storing the identification of the time to transition from the standby state to the active state, the communication device may transition from the active state back to the standby state to save power. The transition that occurs prior to the receiving step may be in response to user actuation of a button on the communication device.

In some aspects, the communication device may receive a command from a user that modifies a presentation speed of a content item presented on a display of the terminal device. In response to receiving the command, the communication device may transmit a message to recalculate the time for the communication device to transition from the standby state to the active state.

A method described herein may comprise determining, by a computing device, when an advertisement is scheduled to be presented relative to a segment of a video program presented by a terminal device. A time for a user device to listen for data from the terminal device may be set to be one of the start time and the end time of the advertisement. The time for the user device to listen for data may be transmitted to the user device. While the user device is listening for data from the terminal device, data corresponding to the advertisement may be transmitted from the terminal device to the user device. This data may be used to generate a display of a second advertisement on a display of the user device.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
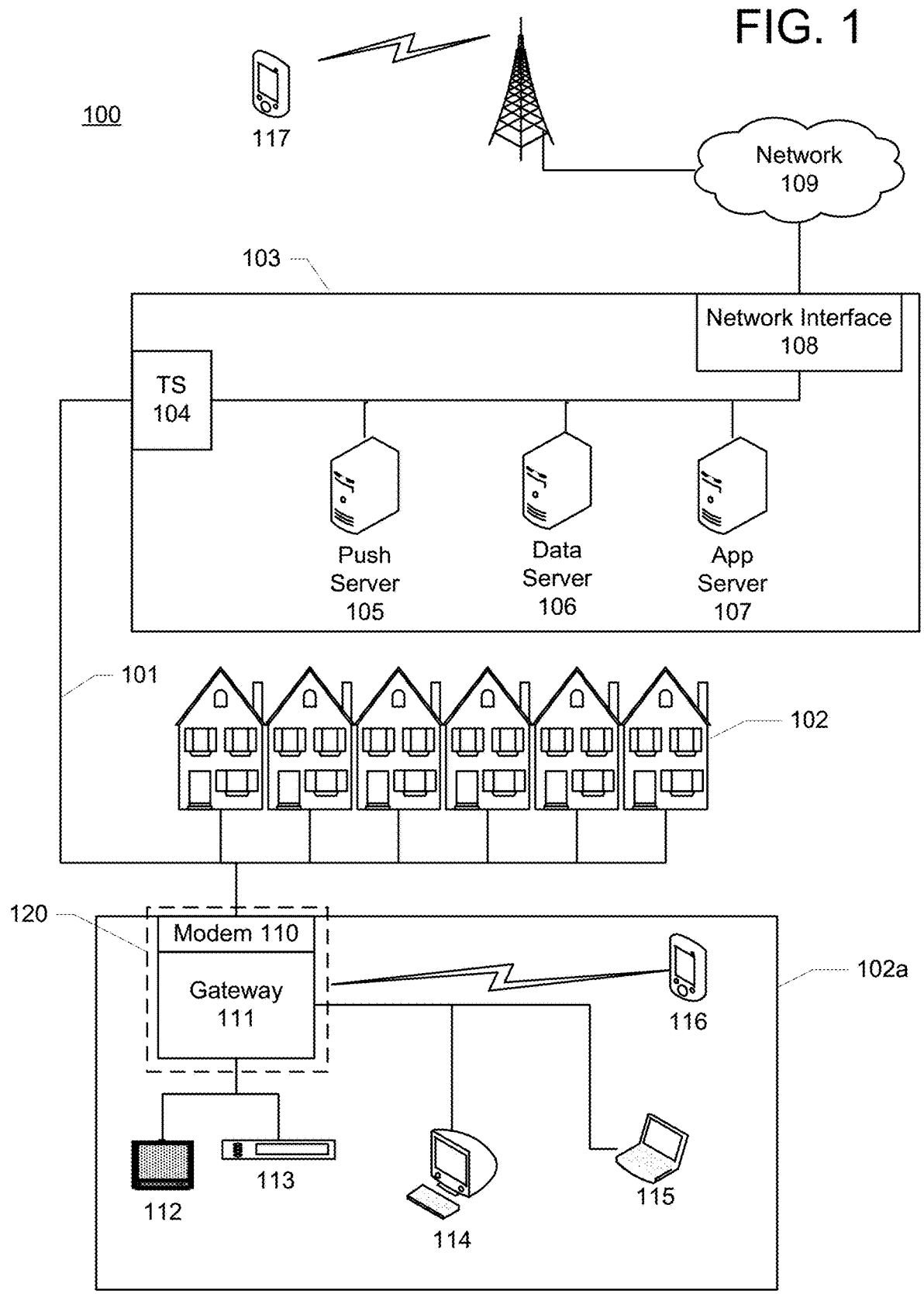
FIG. 1 illustrates an example information access and distribution network.

FIG. 1 illustrates an example information access and distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication links 101 (e.g., coaxial cables, optical fibers, wireless connections, etc.) to connect multiple premises, such as homes 102, to a local office (e.g., a central office or headend 103). The local office 103 may transmit downstream information signals onto the links 101, and each home 102 may have a receiver used to receive and process those signals.

There may be one link 101 originating from the local office 103, and it may be split a number of times to distribute the signal to various homes 102 in the vicinity (which may be many miles) of the local office 103. Although the term home is used by way of example, locations 102 may be any type of user premises, such as businesses, institutions, etc. The links 101 may include components not illustrated, such as splitters, filters, amplifiers, etc. to help convey the signal clearly. Portions of the links 101 may also be implemented with fiber-optic cable, while other portions may be implemented with coaxial cable, other links, or wireless communication paths.

The local office 103 may include an interface 104, which may be a termination system (TS), such as a cable modem termination system (CMTS), which may be a computing device configured to manage communications between devices on the network of links 101 and backend devices such as servers 105-107 (to be discussed further below). The interface 104 may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream channels or frequencies to be received by devices, such as modems at the various homes 102, and to receive upstream communications from those modems on one or more upstream frequencies. The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the network 109, and to other devices on the network such as a cellular telephone network and its corresponding cell phones (e.g., cell phone 117).

As noted above, the local office 103 may include a variety of servers 105-107 that may be configured to perform various functions. For example, the local office 103 may include a push notification server 105. The push notification server 105 may generate push notifications to deliver data and/or commands to the various homes 102 in the network (or more specifically, to the devices in the homes 102 that are configured to detect such notifications). The local office 103 may also include a data server 106. The data server 106 may be one or more computing devices that are configured to provide data to users in the homes. This data may be, for example, video on demand movies, television programs, songs, text listings, etc. The data server 106 may include software to validate user identities and entitlements, locate and retrieve requested data, encrypt the data, and initiate delivery (e.g., streaming) of the data to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102.

An example home 102a may include an interface 120. The interface may comprise a device 110, such as a modem, which may include transmitters and receivers used to communicate on the links 101 and with the local office 103. The device 110 may be, for example, a coaxial cable modem (for coaxial cable links 101), a fiber interface node (for fiber optic links 101), or any other desired modem device. The device 110 may be connected to, or be a part of, a gateway interface device 111. The gateway interface device 111 may be a computing device that communicates with the device 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

The devices in the home also include a remote control device having two-way communication capabilities. In general, two-way communication devices may both receive and transmit data. The remote control device may comprise a television remote control configured to transmit data to a terminal device (e.g., an STB, DVR, television, etc.) and also receive data from the terminal device (or other terminal devices). For example, the remote control device may transmit data to a terminal device and receive data from the same terminal device. Additionally or alternatively, the remote control device may transmit data and receive data from different terminal devices (e.g., transmit data to a television and receive data from an STB).

The wireless devices 116 (e.g., a mobile phone) may function as the remote control device. A mobile phone may be programmed to transmit data, such as commands, to the terminal device (e.g., an STB) and also receive data, such as content or return commands, from the terminal device (or other terminal devices). For example, the mobile phone may include an application configured to generate a display of a remote control interface. The display may be similar to the interface of a television remote control, (e.g., having up/down/left/right buttons, a number pad, a settings button, etc.). One or more advertisements may also be generated and displayed on a display of the mobile phone or television remote control.

The remote control device (e.g., the television remote control, mobile phone, or other portable device) may communicate with the terminal device using a local network (e.g., a wireless connection, such as RF or IR, or wired connection in the home 102a), an external network (e.g., a cellular network, a fiber optic network, a coaxial network, etc.), or any combination thereof. For example, the remote control device may transmit user-generated commands to the STB using an IR or RF link in the home 102a. Alternatively, the remote control device may transmit the command to an external computing device configured to process and/or act on the command using an external link, such as a cellular network. The external computing device may subsequently cause the terminal device to act on the command (e.g., switch channels, display a menu, change user interface settings, etc.) by communicating with the terminal device using the same external link (e.g., cellular link) or another external network link (e.g., fiber optic link, coaxial link, etc.).

Figure 2:
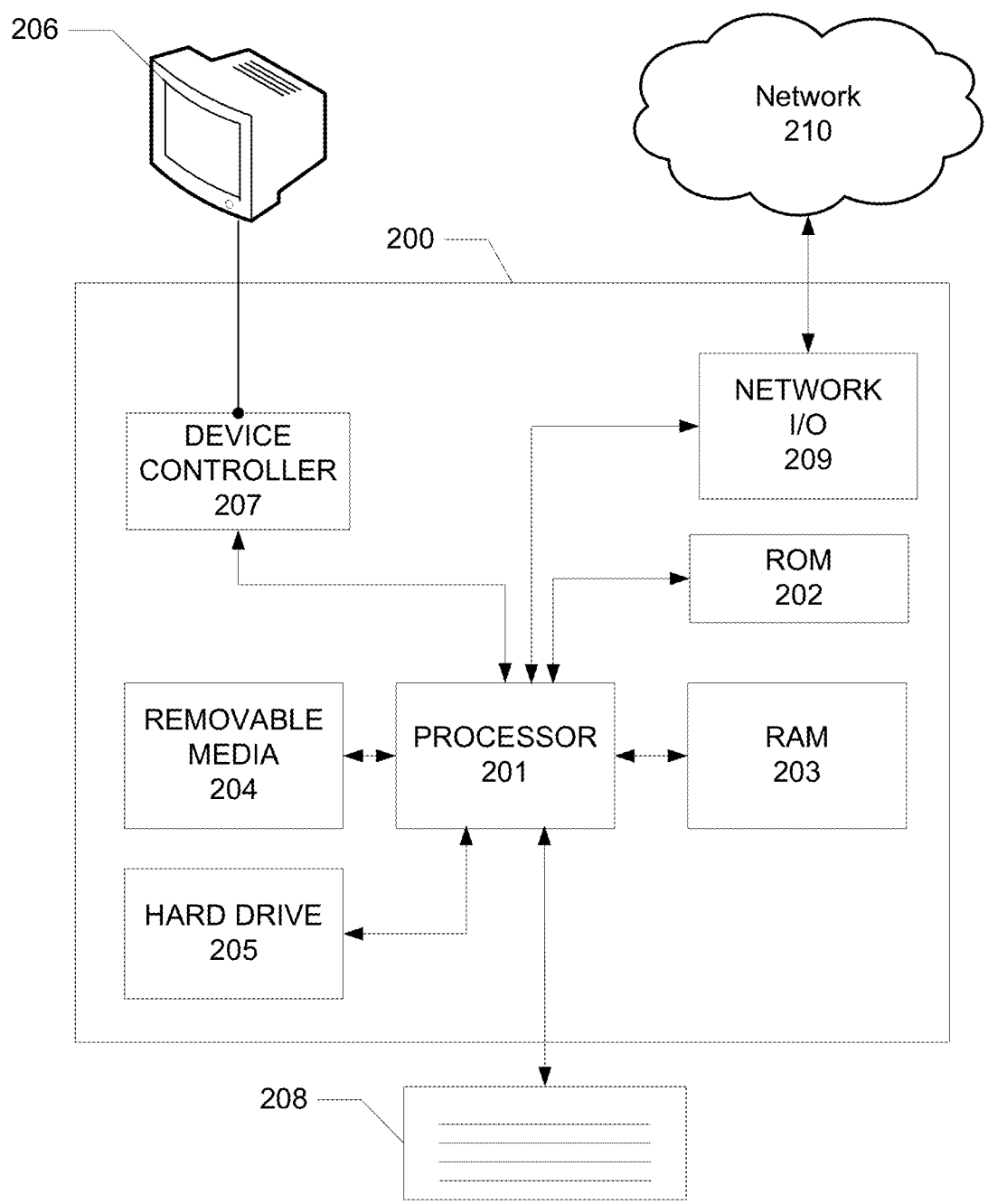
FIG. 2 illustrates an example hardware and software platform on which various elements described herein can be implemented.

FIG. 2 illustrates general hardware and software elements that can be used to implement any of the various computing devices (e.g., terminal devices, remote control devices, etc.) discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication links 101 discussed above, the external network 109, an in-home network, a provider's wireless, coaxial, fiber, or hybrid fiber/coaxial distribution system (e.g., a DOCSIS network), or any other desired network.

The system and methods described herein may be used to schedule the next time a remote control device should listen for data from one or more terminal devices. The scheduled time may correspond to the occurrence or predicted occurrence of a trigger event, such as the start of an advertisement during presentation (e.g., playback) of a content item, such as a video program. The scheduled time may be determined based on one or more factors, such as the current presentation position and presentation speed of the video program, an estimate of the presentation position of the next trigger event, and/or the confidence that the trigger event will occur at the estimated presentation position. Alternatively, if the time of the trigger event is known, the remote control device may listen for data at or near that known time. In addition to listening for data, the remote control device may take additional actions at the scheduled time, such as illuminating backlights, activating a display, buffering content, displaying content on the display, interacting with other devices, etc.

One benefit of the concepts described herein includes the ability to predict when users might use the remote control device (e.g., pressing mute during presentation of an advertisement) and facilitate convenient use of the remote control device, such as by illuminating backlights for buttons that the user might use. Furthermore, the battery life of the remote control device may be extended by selectively activating the remote control device rather than activating the remote at predefined intervals (e.g., 5 minutes, 20 minutes). An additional benefit includes the ability to display content that has been transmitted from a terminal device on a display of the remote control device. For example, a second advertisement that supplements the advertisement displayed by the terminal device may be displayed on the remote control device.

Figure 3:
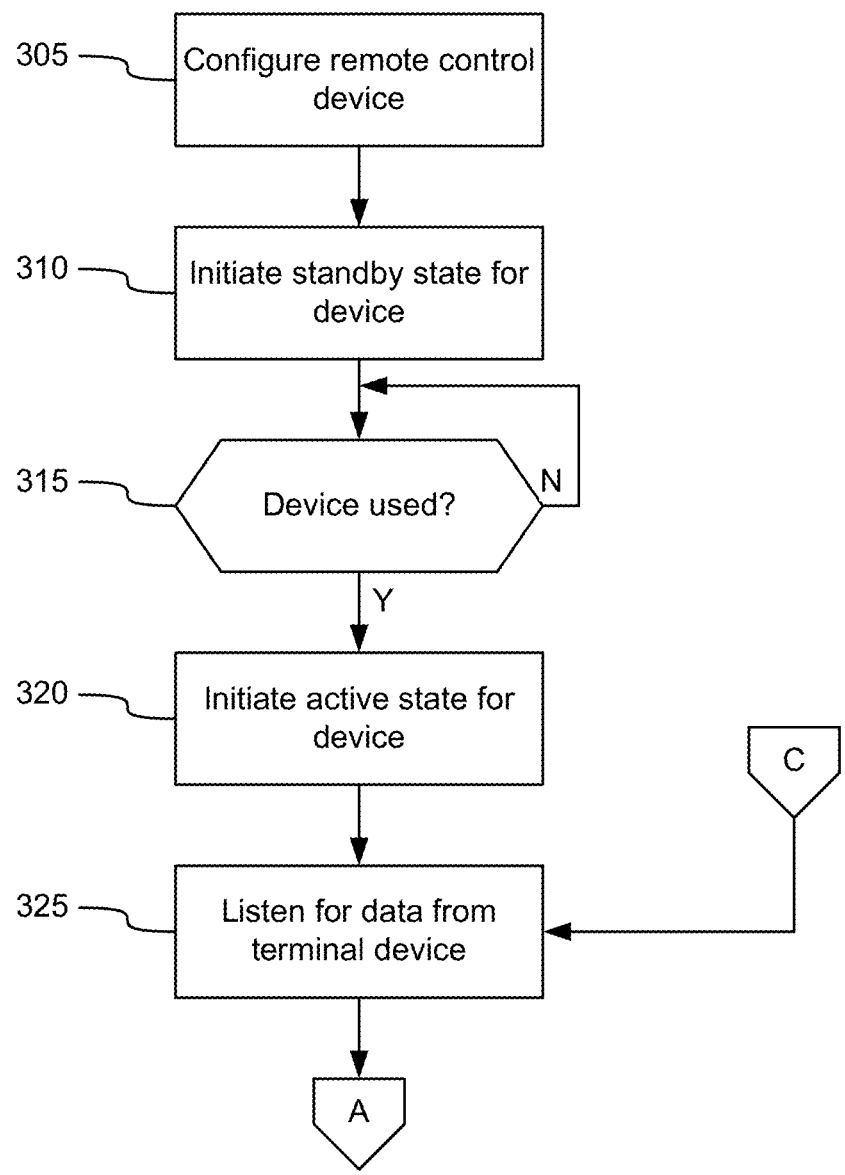
FIG. 3 illustrates an example method of listening for data from a terminal device according to one or more illustrative aspects of the disclosure.

FIG. 3 illustrates an example method of listening for data from a terminal device according to one or more illustrative aspects of the disclosure. The steps illustrated in FIG. 3 may be performed, for example, by a remote control device or other user device. In step 305, the settings for the system for configuring the remote control device to listen for data based on predicted events may be configured. Remote control device states may be determined; the states including an active state, a standby state, an off state, or any other intermediate state. In the active state, the remote control device may be configured to both transmit data to terminal devices and receive (e.g., listen for) data from terminal devices. For example, a transceiver configured to transmit data and receive data may be active or otherwise powered/turned on in the active state. If separate transmitter(s) and/or receiver(s) are used to communicate with terminal devices, those transmitter(s) and/or receiver(s) may be activated so that the remote control device can both send and receive data.

The remote control device may listen for (or otherwise receive) data from one or more terminal devices via one or more communication interfaces and/or communication links. The remote control device may also request data from one or more terminal devices prior to listening for data. The remote control device may have a radio frequency (RF) transceiver and/or receiver interface and listen for RF signals using that interface. The remote control device may have an infrared (IR) transceiver and/or receiver interface and listen for data over IR communication links. The remote control device may have a cellular network (e.g., GSM, CDMA, GPRS, UMTS, LTE, and the like) transceiver and/or receiver interface and listen for data over the cellular network using the interface. The remote control device may have a wireless local area network (WLAN, such as any of the IEEE 802.11 standards) transceiver and/or receiver interface and listen for data over WLAN and/or other wireless interfaces (e.g., WiMax, Bluetooth, etc.). Other examples of wireless communication links between the remote control device and terminal devices include, but are not limited to, visible light links (e.g., use of cameras that are configured to capture visible light and/or pictures), audio links (e.g., communication using sound, which may be audible or inaudible, such as ultrasonic sound waves), and near field communication (NFC). The remote control device and one or more terminal devices may also communicate using wired communication interfaces and/or communication links. Examples include, but are not limited to, power line communication (e.g., HomePlug), communication over coaxial or other cables (e.g., communications using the Multimedia over Coax Alliance (MoCA) standard), communication over Ethernet, and communications using Data Over Cable Service Interface Specification (DOCSIS).

Optionally, backlights on the remote control device, such as indicator lights and/or lights used to illuminate buttons or displays, may be activated in the active state. For example, one or more display screens (which may include touchscreen capabilities), may be turned on or otherwise illuminated. If the remote control device has dedicated backlights for buttons, a set of backlights may be turned on, whereas a different set of backlights may be turned off in the active state. For example, and as will be discussed in further detail in the examples below, the backlight(s) for the fast forward button, the electronic program guide button, the number pad, volume button(s), the mute buttons, and/or the channel up/down button(s) may be illuminated. On the other hand, the power button, the settings button, and/or the play button might not be illuminated during the active state. Backlight or display brightness may also be adjusted. For example, the mute button may be set to 100% of its maximum brightness (or some lower level of brightness, such as 80%), whereas the power button may be set to 0% of its maximum brightness (i.e., off) or some slightly higher level of brightness, such as 20%. In general, the buttons that a user is expected to use during the trigger event (e.g., a commercial) may be brighter than buttons the user is not expected to use during the trigger event. The backlights may also be configured to flash a few times (e.g., 2 times, 3 times) prior to entering the active state or at the beginning of the active state. Optionally, a vibrator in the remote control device (e.g., a vibration motor) may vibrate just prior to or at the beginning of the active state. Similarly, the remote control device may count down, beep, or generate any other audible sound just prior to or at the beginning of the active state.

The remote control device may also be configured for multiple active states, depending on the type of event predicted to occur in the future. As will be described in further detail in the examples below, trigger events may include a commercial, product placement occurring during presentation of a video program, and/or a calendar event. A different type of active state may be assigned to each type of trigger event. For example, if the trigger event is the presentation of a commercial, the remote control device may activate a receiver or transceiver to receive data that supplements the commercial from terminal devices and/or illuminate one or more buttons in a first active state. If the trigger event is a product placement, the remote control device may activate a receiver or transceiver to receive data related to the product (e.g., a link to go to a website for the product) and/or activate a display on the remote control device to display the link in a second active state. If the trigger event is a calendar event (e.g., a scheduled time for the user to watch a television program with a friend), the remote control device may activate a receiver or transceiver to receive a live camera feed from a camera at the user's front door or other external device (e.g., if the user is expecting the friend to show up) in a third active state. The receiver or transceiver configured to receive a camera feed from a camera may, but need not be, different from the receiver or transceiver configured to receive data that supplements a commercial from a terminal device.

The type of active state that the remote control device enters into may also depend on the likelihood (e.g., based on a confidence factor) that the trigger event will occur at the predicted time. If the likelihood that the trigger event will occur is greater than a threshold (e.g., 50%), the remote control device may enter a first active state. For example, backlights may be at 80% of their maximum brightness in the first active state. If the likelihood is less than a threshold, the remote control device may enter a second, different active state. For example, backlights may be at 40% of their maximum brightness in the second active state. Which active state the remote control device enters into may also depend on what commercial is predicted to be presented during presentation of the video program and/or based on the channel that a terminal device, such as an STB, is presently tuned to. The previously-described trigger events and/or active states are included merely as examples. Numerous other trigger events and/or types of active states may be used, as will be described in further detail in the examples below.

In the standby state, the remote control device may deactivate (e.g., turn off) certain functionalities to save battery life. For example, the remote control device might not be configured to listen for (or otherwise receive) data from terminal devices. A transceiver in the remote control device may be turned off or placed in a low power state to prevent the remote control device from listening for data. Turning off the transceiver may also (optionally) prevent the remote control device from transmitting information during the standby state. However, when a physical or virtual button is actuated (e.g., pressed) by a user, the remote control device may still register the button press. If the remote control device includes a microphone configured to receive voice commands from the user, the microphone may be kept active and the remote control device may register voice commands during the standby state. In some embodiments, the microphone may be deactivated, such that the remote control device does not receive and/or process voice commands but does receive and/or process button actuations during the standby state. A backlight indicating to users that the microphone is on and that the remote control device can receive voice commands may be illuminated in either the active state or the standby state. The remote control device may also be configured to sense physical movement of the remote control device using, for example, an accelerometer.

After registering the button press, voice command, and/or sensing movement of the remote control device, the remote control device may transition from the standby state to the active state to transmit the corresponding command to a terminal device or perform any other action. Alternatively, if separate transmitter(s) and/or receiver(s) are used to communicate with terminal devices, the transmitter(s) may be activated so that the remote control device may transmit data during the standby mode. On the other hand, the receiver(s) may be deactivated so that the remote control device may be prevented from receiving data. In some aspects, both the transmitter(s) and receiver(s) may be turned off in the standby state.

Optionally, the backlights of the remote control device (or displays on the remote) may be selectively turned on or off in the standby state. For example, all of the backlights and/or displays may be turned off or dimmed. Alternatively, one set of certain backlights, displays, or regions of displays may be turned off or dimmed, whereas a different set of backlights, displays, or regions of displays may be turned on or brightened. For example, backlights for the number pad, the EPG button, the channel up/down buttons, and/or the remote control device display may be turned off or dimmed, whereas the backlight for the volume up/down buttons may be turned on or brightened. In general, the buttons that a user is expected to use during the standby state (e.g., during presentation of a video program) may be brighter than buttons the user is not expected to use during the standby state.

The remote control device may be configured for other states, such as an off state. The remote control device may enter an off state if an off switch that shuts down power to the device is actuated. In general, the remote control device may consume less power when it is off than when it is in the standby state. In some aspects, the remote control device might not register user actions (e.g., movement of the remote control device and/or user actuation of a button/display) on the remote control device during the off state. In other aspects, the remote control device may register some user actions (e.g., user actuation of a button/display), but not other user actions (e.g., sensing movement of the remote control device using an accelerometer). In other words, the remote control device may deactivate external sensors, such as an accelerometer, while leaving other sensors, such as a tactile or pressure sensor for a physical button, activated. This may be beneficial if energy from physical button presses is harvested.

Other parameters for the remote control device may be set in the configuration step 305. For example, the time for the remote control device to begin listening for data from terminal devices may be set relative to a predicted start time of a trigger event (e.g., a commercial, product placement occurring during the video program, such as a particular brand of soda appearing in a television show, etc.), a predetermined time before the start of the trigger event (e.g., five seconds before the commercial is predicted to start), a predetermined time after the start of the trigger event, the predicted end time of the trigger event, the start of the video program after presentation of a commercial ends, etc.

Furthermore, the types of actions taken by the remote control device after transitioning from the standby state to the active state (or vice versa) may be defined. For example, after transitioning from the standby to active states, the remote control device may listen for data from terminal devices, turn on/off backlights, activate a microphone, play a sound, brighten/dim backlights, adjust backlight colors, display supplemental advertisements, and/or a combination of actions. In order to carry out these actions, the remote control device may transition from the active to standby states (or vice versa).

By configuring in step 305, the system of listening for data based on predicted events may be enabled or disabled. If the system is enabled, the remote control device may be configured to transition between the active, standby, and other states as previously discussed. If the system is disabled, the remote control device may remain in one state (e.g., active state or standby state), even if a commercial or other trigger event is predicted to occur. The remote control device may be configured to perform certain default actions if the system is disabled. For example, the remote control device may listen for data at periodic intervals (e.g., every 10 seconds) or only after the user uses the remote control device.

Configuration may occur at any time, and the user can trigger the configuration. The user may use the remote control device, the terminal device (e.g., an STB), or a combination thereof to configure or reconfigure the remote control. For example, the remote control device may have physical or virtual configuration settings buttons that allow the user to adjust the configuration of the remote control device. Additionally or alternatively, a menu may be displayed on the terminal device (or a display device connected thereto) or on the remote control device itself. The user may configure the remote control device by navigating the menu. The configuration may be stored in a user's account or profile, which may be stored locally or on a network (e.g., in the cloud). The configuration data may be pushed automatically to any new remote control device that the user users or otherwise brings online.

In step 310, the remote control device may initiate the standby state. The remote control device may enter the standby state after remote control device has been configured or a predetermined time thereafter (e.g., 10 seconds). Additionally or alternatively, the remote control device may enter the standby state after the remote control device finishes sending data, such as a command, to the terminal device or a predetermined time thereafter. As will be discussed in further detail in the examples below, the remote control device may enter the standby state after the remote control device has received information indicating the next time that the remote control device should listen for data.

In step 315, the remote control device may determine whether a user has used the remote control device. The user may use the remote control device to issue commands (such as channel up, volume down, display EPG, mute, etc.), to a terminal device (such as an STB) and/or to use any other functionalities of the remote control device. Additionally or alternatively, the remote control device may sense movement of the remote control device using, for example, an accelerometer or other motion sensor. Based on detecting movement, the remote control device may determine that it has been used in step 315. If the remote control is used (step 315: Y), the remote control device may initiate the active state in step 320. As previously discussed, the remote control device may illuminate a backlight and/or turn on a receiver or transceiver to listen for data from one or more terminal devices (in step 325) when it transitions from the standby state to the active state. Instead of passively listening for data, the remote control device may transmit, to the terminal device, a request for information, such as a poll request. The information received from the terminal device and/or in response to the poll request may include the next time the remote control device should listen for data. The information may include clock drift adjustment information to synchronize the remote control device's clock with the terminal device's (or other external device's) clock. The information may also include information identifying the content of the next trigger event (e.g., the type of commercial, the product in the commercial, the commercial name, etc.) if the information is known.

The remote control device may enter the active state at any time instead of waiting for the remote control device to be used. As will be discussed in further detail below with respect to FIGS. 4 and 5, the remote control device may receive information from a terminal device identifying the next time the remote control device should listen for data or otherwise enter the active state. The identified time may correspond to the time an advertisement is expected to be presented during presentation (e.g., playback) of a video program (e.g., a broadcast program, video on demand program, DVR program, etc.). Accordingly, the remote control device may initiate the active state (in step 320) at the start of the video program or some predetermined time after the start of the video program (e.g., 1 minute into the video program), such as if a commercial typically plays just after the opening scenes of the program (e.g., a recap of a previous episode). Additionally or alternatively, the remote control device may enter the active state (or otherwise poll for information from terminal devices) immediately (or a predetermined time) after the remote control device has been turned on, such as after the batteries of the remote control device have been inserted or replaced. The remote control device may similarly enter the active state at any predetermined time without waiting for user input. For example, the remote control device could poll for information every few hours when it is not being heavily used by the user, is out of range, is offline, etc.

Figure 4:
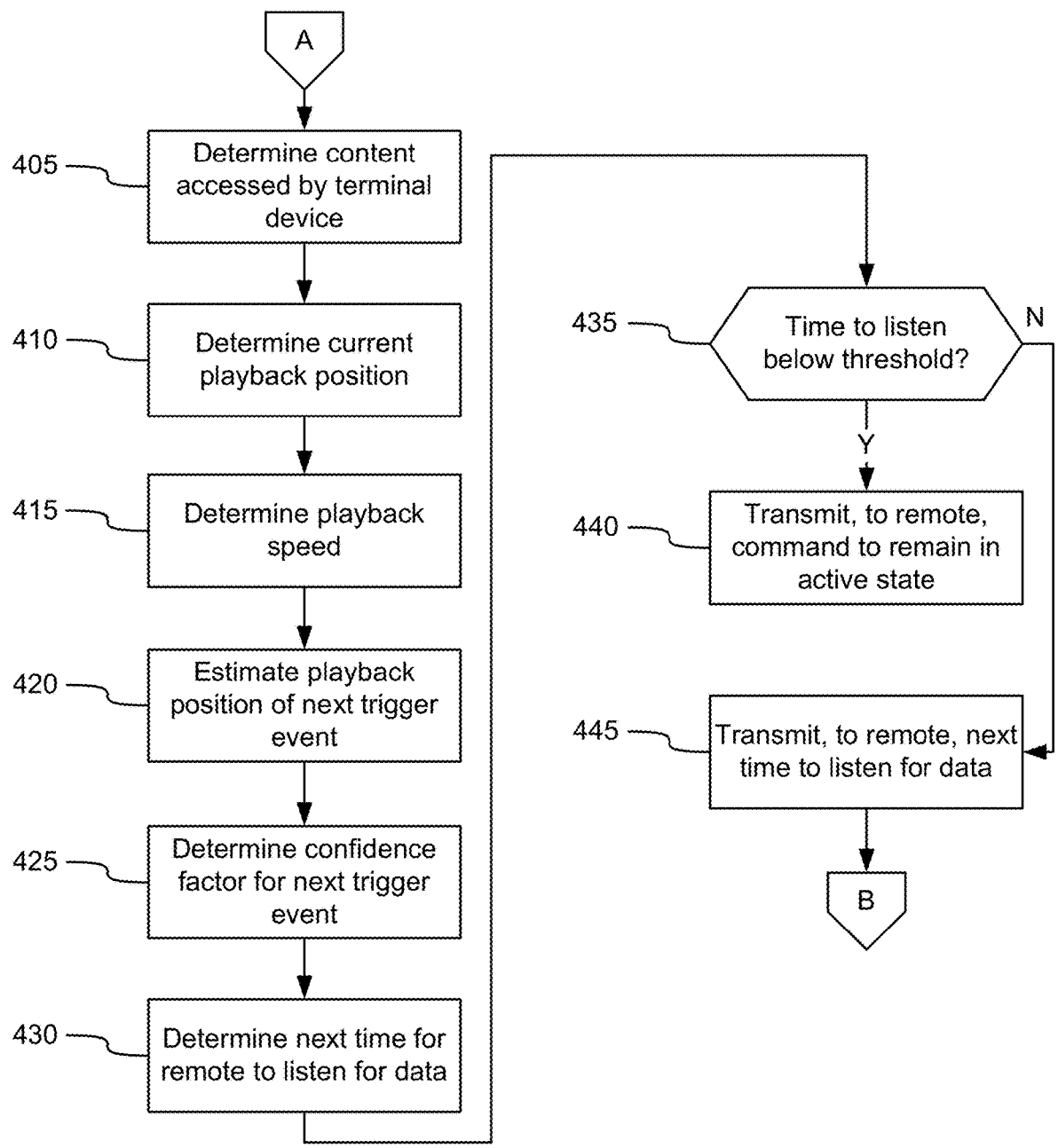
FIG. 4 illustrates an example method of determining the next time to listen for data from the terminal device based on a predicted event according to one or more illustrative aspects of the disclosure.

FIG. 4 illustrates an example method of determining the next time for the remote control device to listen for data from terminal devices based on predicted events according to one or more illustrative aspects of the disclosure. The steps illustrated in FIG. 4 may be performed by a terminal device that transmits data to the remote control device or any other device associated with the terminal device that may be located at the home 102, local office 103, and/or distributed among one or more locations (e.g., in a cloud computing environment). For the sake of brevity, the steps illustrated in FIG. 4 will be described as being performed by a terminal device, which may physically comprise one or more computing device.

In step 405, the content currently being accessed (e.g., received, displayed, or otherwise presented) by the terminal device may be identified. For example, the terminal device may comprise STB 113 at the user's home 102a. STB 113 may be presenting, to the user, content (e.g., a video program, such as an episode of a television program) received from the local office 103 (e.g., a video on demand movie, television program, etc.) or any other content source (e.g., Internet servers or other network devices). The terminal device may identify the content item based on a program or packet identifier received with the content item, based on a textual description of the content item in an electronic program guide (EPG) that lists the content item, based on program specific information including Program Association Tables (PATs) and Program Map Tables (PMTs) associated with programs transmitted to the STB, based on content fingerprinting or watermarking, and/or based on any other method of identifying the content item known to one of ordinary skill in the art.

In step 410, the terminal device may determine the current presentation position (time) of the content item. The current presentation position may be measured relative to the start time of the content item. For example, if the user is 14 minutes and 20 seconds into an episode of a television program, the terminal device may determine that the current presentation time is 14 minutes and 20 seconds. The start of the television program may be the baseline (i.e., 0 minutes).

In step 415, the terminal device may determine the current presentation speed of the content item. The content item may be presented at a normal/baseline presentation speed (e.g., 1× presentation speed), which may occur, for example, if the user presses a 'play' button on the terminal device or remote control device. The content item may also be presented at slower presentation speeds (e.g., 0.5×, etc.) or faster presentation speeds (e.g., 2×, 3×, 4.5×, etc.). These presentation speeds may occur if the user presses a 'slow motion' button (e.g., for 0.5× speed), 'fast forward' or 'skip' buttons (e.g., for 2×, 3×, 4.5×, etc. speeds), or any other buttons on the terminal device or remote control device.

In step 420, the terminal device may identify one or more trigger events expected to occur in the future and estimate the presentation time(s) for the trigger events. As previously discussed, trigger events may include an advertisement, such as a television commercial, expected (or otherwise scheduled) to be presented during presentation of a video program, such as a television program. Alternatively, trigger events may include placement of a product during presentation of the video program. For example, if a particular brand of soda appears at minute 16 of the video program (or a song plays back at that time), the trigger event may be the appearance of the soda (or the playing of the song). In some aspects, marks (e.g., tags) may be included with the video program to identify the location of product placements. Trigger events may also include events included on the user's calendar (e.g., GOOGLE calendar, OUTLOOK calendar, or other electronic calendar) or on the calendar of a person associated with the user, such as a friend. The calendar events may correspond to scheduled activities for the user and/or friend. For example, the calendar entry may indicate that the user and the user's friend plan to watch a television program together on Tuesday at 7:00 PM. Accordingly, Tuesday at 7:00 PM may comprise the time of the trigger event. If the trigger event was previously defined in the configuration step 305, the terminal device may identify the trigger event by retrieving the information stored during the configuration step. The presentation time of the commercial may correspond to the start time of the commercial, at a predetermined time before the state of the commercial, in the middle of the commercial, at the end time of the commercial, at the start of the video program after presentation of the commercial ends, etc.

Figure 6:
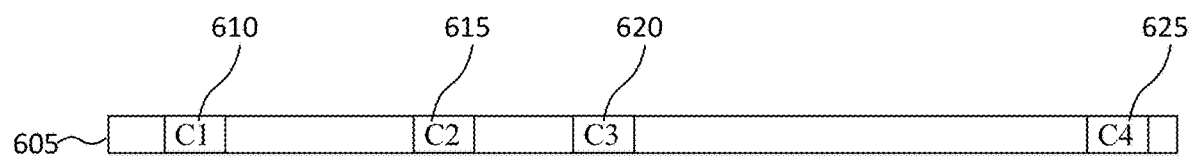
FIG. 6 shows a graphical representation of a previous episode having commercials.

In some embodiments, the terminal device may estimate the presentation time of the next commercial by retrieving data from a database of content items associated with or otherwise similar to the content item accessed by the terminal device. For example, the content item may comprise an episode of a television program and the database may store data describing previous episodes of the same television program, including the start and end times of commercials presented during those previous episodes. FIG. 6 shows a graphical representation 600 of a previous episode 605 having commercials. FIG. 6 shows four commercials, such as a first commercial C1 (610), a second commercial C2 (615), a third commercial C3 (620), and a fourth commercial C4 (625).

The four commercials, C1-C4 (610-625), may have been presented during a 30 minute episode of the television program (e.g., a previous episode). For example, the commercial C1(610) may have started 48 seconds into the television program (e.g., following the opening scenes and/or recap of previous episode(s)), the commercial C2(615) may have started 9 minutes and 24 seconds into the program, the commercial C3(620) may have started 13 minutes into the program, and the commercial C4(620) may have started 28 minutes and 2 seconds into the program (e.g., before the credits and/or end scenes). If the user is 30 seconds into the currently presented episode of the television program, the terminal device may estimate (in step 420) that the next trigger event (e.g., the start of the next commercial) will occur 48 seconds into the current episode, based on the start time of the commercial C1(610) in the previous episode. If data for more than one previous episode is used, the average start time of the commercial C1(610) may be used as the estimate for the current episode. For example, the commercial C1(610) in a different previous episode may have started 54 seconds into the program. The terminal device may estimate that the start of the next commercial in the current episode will occur 51 seconds into the current episode, based on the average start time of the commercials in the two previous episodes. The database may similarly store the length and/or end time of each of the commercials C1-C4 (610-625). Similar data may be stored for many previous episodes (e.g., 5 episodes, 30 episodes, 100 episodes, etc.).

Databases may similarly store data for other types of programs, such as miniseries and movies. For example, if the video program is the final movie in a trilogy of movies, the database may store data describing the first two movies in the trilogy including commercial times. Other classifications may be used to identify similar content items for the database, such as genre, cast members, directors, writers, and/or a combination thereof. For example, if the video program currently being presented by the terminal device is an action movie starring Bruce Willis, the database may store data (e.g., commercial times) describing other action movies starring Bruce Willis.

In step 425, the terminal device may determine a confidence factor for each estimated presentation time of the next trigger event. The terminal device may rely on the database of similar content items described above to determine the confidence factor. For example, assume that commercial C1(610) has started 48 seconds or earlier into the program, in only 5% of the previous episodes. The confidence that the first commercial in the currently presented episode will occur 48 seconds into the episode is 5%. Similarly, if commercial C1(610) has started in 20% of the previous episodes 52 seconds or earlier into the program, the confidence factor may be 20%. If commercial C1(610) has started in 40% of the previous episodes 57 seconds or earlier into the program, the confidence factor may be 40%. If commercial C1(610) has started in 50% of the previous episodes 60 seconds or earlier into the program, the confidence factor may be 50%. And, if commercial C1(610) has started in 100% of the previous episodes 75 seconds into the program, the confidence factor may be 100%.

Other factors may be used to determine confidence factors. These include the typical (e.g., average) number of minutes of commercials relative to the amount of time allotted the program. For example, a 30 minute time slot may comprise, on average, 22 minutes of content and 8 minutes of commercials. Longer time slots (e.g., a 1 hour time slot) may scale substantially linearly or linearly (e.g., 44 minutes of content and 16 minutes of commercials). Confidence may also be based on the typical length of each commercial, which may depend on the content type. For example, the average length of a TV commercial may be 2 minutes, whereas the average length of a movie commercial may be 3 minutes. Confidence may also depend on how far into the program the user is and how many minutes of commercials have been presented thus far. For example, assume that the current presentation time is 21 minutes (in a 30 minute time slot), and six minutes of commercials have been presented so far. Based on an average of 8 minutes of commercials per 30 minute time slot, 2 minutes of commercials may remain. The terminal device may determine that the next expected commercial break is at the 25 minute mark with a high confidence (e.g., 50% or greater confidence) because only a few minutes of the program remain and two of those minutes should be allocated to the commercial(s).

In step 430, the terminal device may determine the next time for the remote control device to listen for data from the terminal device or other terminal devices. In some aspects, the current presentation position, presentation speed, estimate of the presentation position of the next trigger event, and the confidence factor may be used to make this determination, according to the following algorithm:

$$\text{Time to Listen} = \frac{((\text{Estimate of Trigger Event}) - (\text{Current playback position})) \times (1 - \text{Confidence Factor})}{\text{Playback Speed}}$$

As previously discussed, if the program is being presented at normal speed (e.g., 1×), the presentation speed factor may be 1. Similarly, if the program is being presented at a higher speed (e.g., 2×), the presentation speed factor may be higher (e.g., 2), and if the program is being presented at a slower speed (e.g., 0.5×), the presentation speed factor may be lower (e.g., 0.5). As a result, the higher the presentation speed, the sooner the Time to Listen will be. The lower the presentation speed, the later the Time to Listen will be. The following table provides example calculations of the Time to Listen for a remote control device where the presentation speed is 1 and the current presentation position is 30 seconds into the program. Each estimate for the trigger event time may comprise a different confidence factor.

TABLE 1

| Estimate of Trigger Event (seconds) | Calculation | Time to Listen from current time / from program start time (seconds) |
|---|---|---|
| 48 | $\frac{(48 - 30) \times (1 - 0.05)}{1}$ | 17.1/47.1 |
| 52 | $\frac{(52 - 30) \times (1 - 0.20)}{1}$ | 17.6/47.6 |
| 57 | $\frac{(57 - 30) \times (1 - 0.40)}{1}$ | 16.2/46.2 |
| 60 | $\frac{(60 - 30) \times (1 - 0.50)}{1}$ | 15.0/45.0 |

One of these results may be used as the next time for the remote control device to listen for data. For example, the second standard deviation where 5% of the commercials C1(610) have started (e.g., an estimate of 48 seconds for the next trigger event) may be used. In other words, the remote control device may be instructed to listen for data 17.1 seconds from the current time (or 47.1 seconds into the video program/time slot). The first standard deviation or third standard deviation may similarly be used. Any of the other Times to Listen may be selected. For example, the soonest Time to Listen (e.g., 15 seconds from the current time) may be used so that there will be a greater chance that the next time to listen will occur prior to the start of the next commercial. A Time to Listen may also be derived from more than one of the calculated Times to Listen. For example, the terminal device may take the average of the four calculated Times to Listen, resulting in a Time to Listen of 16.5 seconds from the current time (or 46.5 seconds into the video program/time slot).

In alternative embodiments, the terminal device may select the Time to Listen to correspond to the earliest start time of the commercial C1(610) in the database or a predetermined time prior to the start time. For example, the Time to Listen may be 43 seconds if the earliest start time for the commercial C1(610) in all previous episodes is 43 seconds into the program or a predetermined time prior to the start time (e.g., 38 seconds into the program if the predetermined time is 5 seconds).

In yet additional embodiments, the start time of a commercial for the video program currently being accessed may be known ahead of time. For example, the commercial presentation times may be known in a pre-recorded (e.g., non-live) video program. In these embodiments, the terminal device may set the Time to Listen to the start time of the scheduled advertisement, a predetermined time prior to the start time (e.g., 1 second before), or a predetermined time after the start time (e.g., 2 seconds after). If the presentation times for more than one commercial are known, the terminal device may set multiple Times to Listen, one for each of the known commercial times. The terminal device may transmit the multiple Times to Listen to the remote control device (e.g., as metadata) as will be described in further detail with respect to step 445 below. In this example, the remote control device might only need to listen for data (or poll for data) from the terminal device just once for each pre-recorded program. The remote control device may still keep its clock synchronized with the terminal device and/or track presentation speed changes, as will be discussed in further detail in the examples below.

In step 435, the terminal device may determine whether the determined Time to Listen is below a predetermined threshold, which may be, for example, anywhere between 1 and 3 seconds from the current time. If the Time to Listen is below the threshold (step 435: Y), the terminal device, in step 440, may transmit a command to the remote control device to remain in the active state because the trigger event is expected to occur very soon and/or to prevent the remote control device from excessively switching between the active and standby states. If, on the other hand, the Time to Listen is not below the threshold (step 435: N), the terminal device, in step 445, may transmit the Time to Listen determined in step 430 to the remote control device. Optionally, the terminal device may transmit, with the command in step 440 or Time to Listen in step 445, action(s) that the remote control device should take the next time it listens for data or enters the active state (e.g., illuminate a backlight, display an advertisement, etc.).

Figure 5:
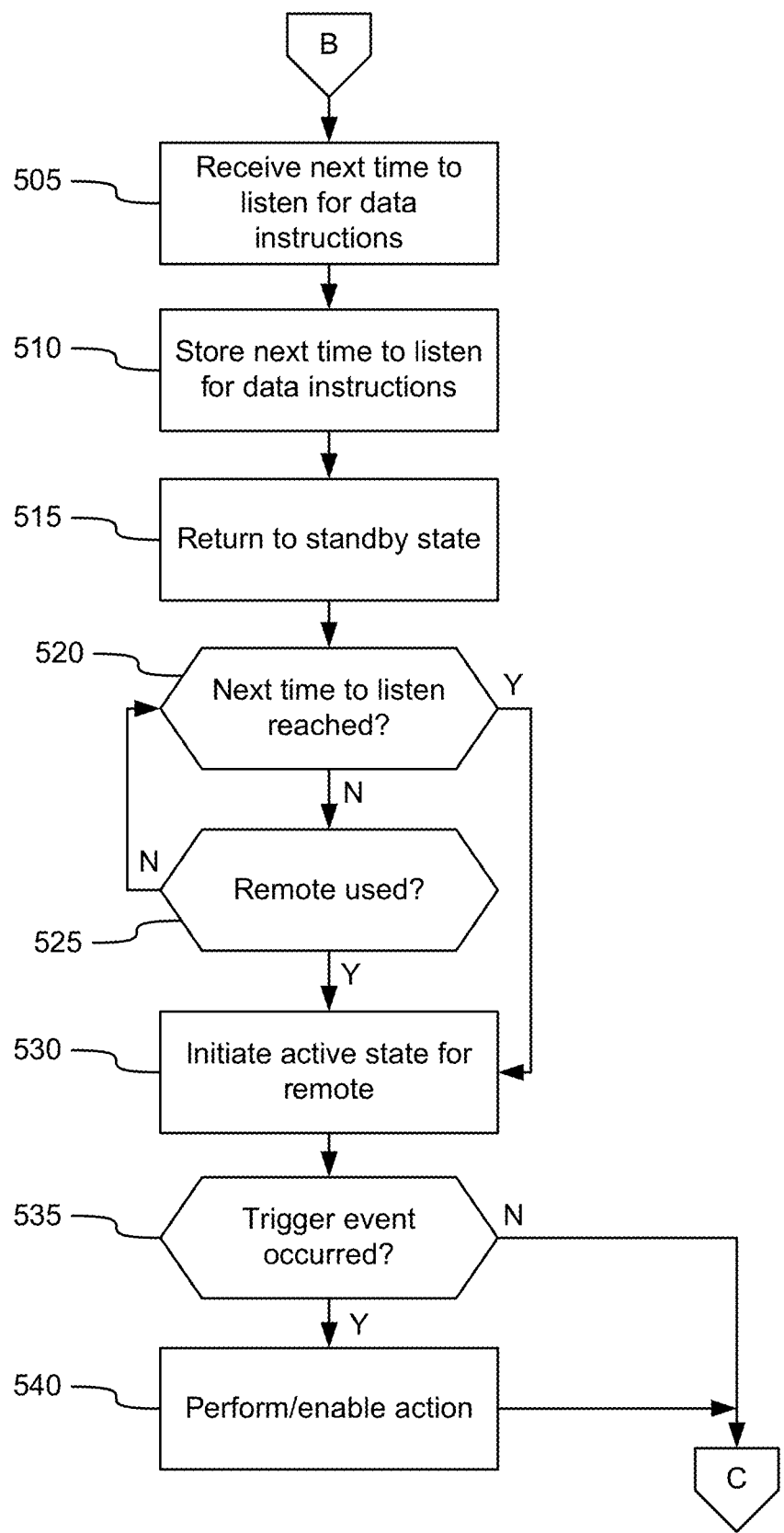
FIG. 5 illustrates an example method of listening for data from the terminal device at the determined next time to listen according to one or more illustrative aspects of the disclosure.

FIG. 5 illustrates an example method of listening for data from the terminal device at the determined next time to listen according to one or more illustrative aspects of the disclosure. The steps illustrated in FIG. 5 may be performed by the remote control device or other user device. In step 505, the remote control device may receive the data identifying the next time for the remote control device to listen for data. In step 510, the remote control device may optionally store the Time to Listen data in memory. In step 515, the remote control device may return to the standby state after storing the Time to Listen data (e.g., immediately after storage or a predetermined time thereafter, such as 2 seconds).

In step 520, the remote control device may determine whether the next time to listen has been reached. For example, the remote control device may compare the Time to Listen to an internal system clock in the remote control device. If the Time to Listen has not been reached, in step 525, the remote control device may determine whether the remote control device has been used, such as by a user/viewer. The remote control device may repeat steps 520 and 525 (in any order) until the Time to Listen has been reached or the remote control device has been used. For example, the user may issue a command from the remote control device before the Time to Listen is reached (step 525: Y), or the Time to Listen may be reached before any user activity occurs (step 520: Y). In some embodiments, if the user presses a button that changes the presentation speed of the program (e.g., fast forward, rewind, skip, play, etc.), the terminal device may perform one or more of the steps illustrated in FIG. 4 using the new presentation speed to recalculate the time for the remote control device to listen for data.

In step 530, the remote control device may initiate the active state in response to the Time to Listen being reached or in response to user activity on the remote control. As previously described, when the remote control device enters the active state, the remote control device may listen for data from terminal devices (e.g., by turning on or otherwise activating a receiver or transceiver), illuminate backlights, or perform other actions. Additionally or alternatively, the remote control device may poll for information from the terminal device instead of passively listening for data during the active state (e.g., send a request for information to the terminal device and receive a message back). Instead of immediately performing these actions in response to entering the active state, the remote control device may optionally perform steps 535 and/or 540.

In step 535, the remote control device may determine whether the expected trigger event occurred. For example, if the trigger event is the start of a commercial, and the commercial has begun when the remote control device enters the active state, the remote control device may determine that the expected trigger event occurred (step 535: Y). In response to determining that the trigger event occurred, the remote control device, in step 540, may perform the actions noted above, including illuminating backlights, listening for data, displaying information based on data received from terminal devices, etc. These actions may have previously been stored during the configuration step 305.

Several exemplary actions that the remote control device may perform/enable will now be described. One or more backlights on the remote control device, such as backlights for certain buttons, may be illuminated when a commercial begins to play. For example, one or more of the backlights for the fast forward button, the electronic program guide button, the number pad, volume button(s), the mute buttons, and/or the channel up/down button(s) may be illuminated. Illuminating the fast forward button allows the user to easily identify the fast forward button in order to advance through the commercial. Illuminating the electronic program guide button, the number pad, and/or the channel up/down button(s) allows the user to easily browse or navigate between channels during the commercial. Illuminating the volume buttons or mute button allows the user to turn down the volume during the commercial (or up if the user is interested in the commercial). Backlights for other buttons that the user is not expected to use during commercials, such as the power button, the settings button, and/or the play button, might not be illuminated (or may be kept at a dimmer setting or use a different color than the buttons that the user is expected to use). A microphone used to receive voice commands from users may also be activated in step 540.

The remote control device may have an integrated display or may be connected to a separate display, including a touchscreen display device. During the active state, the remote control device may listen for data from terminal devices, and the data may comprise information for rendering content on the display of the remote control device. The content may comprise advertisement data that corresponds to or otherwise supplements the advertisement displayed by the terminal device (or other playback device). For example, if the commercial displayed by the terminal device is car commercial, supplemental information received by and displayed on the remote control device display may comprise a map of local car dealerships selling that brand of car or a gift for test driving the brand of car (e.g., a $50 gift card if the user tests drive the car).

If the trigger event corresponds to product placement during presentation of the video program, the remote control device may receive and display information corresponding to that product (e.g., a link to purchase the product, an advertisement of the product, a coupon for the product, etc.). For example, if soda brand A appears during a television show, the remote control device may receive, from a terminal device, information for rendering, on the display of the remote control device, a coupon (or other discount) for purchasing soda brand A products. Alternatively or additionally, the remote control device may display an interface for interacting with the advertisement presented by the terminal device if the advertisement and/or terminal device is configured for interactivity (e.g., an interactive television, program, or advertisement). For example, the interface may give the user the option to purchase the advertised product or service (e.g., a link or QR code to a website to purchase the product, text boxes for receiving payment information, such as credit card information, text boxes to receive an email address, a button to sign up for a particular service, and the like). The remote control device may also display a link to an app in an application store or cause the link or other information related to the advertised product or service to be displayed in social media (e.g., FACEBOOK, TWITTER, etc.) if the user has tied his or her social media account to the service described herein.

If the trigger event corresponds to a calendar entry (e.g., if the user of the remote control device and a friend have scheduled to watch a video program together), the remote control device may display the calendar entry or a message corresponding to the calendar entry. An example message may state: "According to your calendar, you and Tommy plan to watch Movie A together in 5 minutes (7:00 PM)." Additionally or alternatively, the remote control device may interact with another device, such as a camera at the user's front door. For example, a live camera feed from the front door camera may be streamed to the remote control device and displayed on the remote control device when the friend is expected to arrive to watch the video program with the user.

The information displayed on the remote control device display need not supplement or correspond to the commercial displayed by the terminal device. For example, the remote control device could display a second commercial that is unrelated to the one displayed by the terminal device. As another example, the remote control device could display an EPG, allowing the user to navigate the EPG on the remote control device without disrupting presentation of the commercial by the terminal device. The remote control device could also display content that supplements the video program, such as extra features content or webisode content, during presentation of the commercial or the video program.

In some aspects, the terminal device and/or remote control device may interact with other devices in the home in the active state. For example, if lights in a living room are connected to the same network as the terminal device and/or remote control device, one of these devices could issue a command to the lights to illuminate or brighten during presentation of the commercial. The terminal device and/or remote control device may interact with a video camera at the user's home (e.g., at the front door). For example, if a friend is expected to arrive at the user's home at the time of the trigger event, the video camera at the user's front door may transmit a live camera feed to be displayed on the remote control device.

Instead of corresponding to the beginning of the commercial, the trigger event may correspond to the end of the commercial. The end of the commercial may be predicted in a similar manner as that described above for predicting the start of the commercial. Alternatively, the end of the commercial may be predicted based on the predicted start time of the commercial and adding on the expected length of the commercial (e.g., 2 minutes, 3 minutes, etc.). If the trigger event is the end of the commercial, the opposite of the actions previously discussed may be performed. For example, after the commercial ends, the backlights that were illuminated during the commercial may be turned off or dimmed. Backlights for other buttons that the user may be expected to use while watching the program (e.g., volume buttons, display settings buttons) may be illuminated or kept illuminated if already illuminated. The information displayed on the remote control device display may be removed when the commercial on the terminal device ends. Alternatively, the information may be left on the remote control device or new information may be displayed on the remote control device when the program begins. For example, in some instances, users may have missed the commercial displayed by the terminal device, so the commercial (or a simpler version of the commercial, such as a web link, a banner advertisement, an image, etc.) may persist on the remote control device for a predetermined amount of time after the commercial on the terminal device ends (e.g., thirty seconds).

If the trigger event did not occur (step 535: N) and/or after performing the actions in step 540, the remote control device may return to step 325 and listen for data from the terminal device. Listening may be performed before, during, or after the actions (in step 540) are performed. If, for example, the trigger event did not occur, the terminal device may perform one or more of the steps illustrated in FIG. 4 to recalculate the next time the remote control device should listen for data. Each time the terminal device recalculates the Time to Listen, the confidence factor may increase and the interval between the current time and the time to the next commercial may decrease. This may cause the remote control device to listen for information more frequently (e.g., every 5-10 seconds). However, as previously described with respect to step 435, there may be a threshold (e.g., 1-3 seconds) that prevents the remote control device from transitioning between the active state and the standby state too frequently. Furthermore, incremental actions may be taken by the remote control device each time it listens for data and/or enters the active state. For example, as the terminal device gets closer to displaying the commercial and the remote control device starts to poll more frequently, the backlight could start off dim and slowly get brighter, peaking when the commercial actually starts (e.g., step 535: Y). A similar dimming action could be performed if the trigger event is the end of the commercial. The slope of the brightening and/or dimming may also correlate to the confidence factor previously described. For example, the backlight may transition more quickly from an off state to a certain level of brightness (e.g., 80%) if the confidence is high and more slowly if the confidence is low. On the other hand, if the trigger event did occur (step 535: Y), the terminal device may perform one or more of the steps illustrated in FIG. 4 to estimate a time for the next commercial to be displayed and a corresponding time for the remote control device to listen for data.

The various features described above are merely non-limiting examples, and can be rearranged, combined, subdivided, omitted, and/or altered in any desired manner. For example, features of the computing device (including the remote control device and the terminal device) described herein can be subdivided among multiple processors and computing devices. The true scope of this patent should only be defined by the claims that follow.

The invention claimed is:

1. A non-transitory computer-readable medium storing instructions that, when executed, cause:
    determining, by a first computing device, a time for a communication device to switch from a standby state to an active state, wherein the communication device is configured to activate one or more microphones and to receive voice commands via the one or more microphones during the active state, and wherein the communication device is configured to deactivate the one or more microphones during the standby state; and
    sending, by the first computing device and to the communication device, an indication of the time for the communication device to switch from the standby state to the active state.

2. The computer-readable medium of claim 1, wherein the instructions, when executed, cause:
    determining a content item being output for display by a display device, wherein determining the time for the communication device to switch from the standby state to the active state is based in part on a time of an event occurring during output of the content item for display by the display device.

3. The computer-readable medium of claim 2, wherein the communication device is configured to monitor for data from one or more of the first computing device or the display device during the active state.

4. The computer-readable medium of claim 2, wherein the time for the communication device to switch from the standby state to the active state comprises a start time of an advertisement occurring during output of the content item for display by the display device, and wherein the instructions, when executed, cause:
    at the time for the communication device to switch from the standby state to the active state, sending, by the first computing device, to the communication device, advertisement data that supplements the advertisement occurring during output of the content item.

5. The computer-readable medium of claim 1, wherein the instructions, when executed, cause:
    at the time for the communication device to switch from the standby state to the active state, sending, by the first computing device, to the communication device, an instruction to illuminate one or more backlights of the communication device, wherein the one or more backlights indicate that the one or more microphones of the communication device are active.

6. The computer-readable medium of claim 1, wherein the communication device comprises at least one of a device configured to function as a two-way remote control or a mobile phone configured to control presentation of content.

7. A system comprising:
a communication device; and
a computing device comprising:
one or more processors; and
memory storing instructions that, when executed by the one or more processors of the computing device, cause the computing device to:
determine a time for the communication device to switch from a standby state to an active state; and
send, to the communication device, an indication of the time for the communication device to switch from the standby state to the active state; and
wherein the communication device is configured to:
receive the indication,
activate one or more microphones and receive voice commands via the one or more microphones during the active state, and
deactivate the one or more microphones during the standby state.

8. The system of claim 7, wherein the instructions, when executed by the one or more processors of the computing device, cause the computing device to:
determine a content item being output by a display device; and
determine the time by determining, based in part on a time of an event occurring during output of the content item by the display device, the time for the communication device to switch from the standby state to the active state.

9. The system of claim 8, wherein the communication device is configured to monitor for data from one or more of the computing device or the display device during the active state.

10. The system of claim 8, wherein the time for the communication device to switch from the standby state to the active state comprises a start time of an advertisement occurring during output of the content item by the display device, and the instructions, when executed by the one or more processors of the computing device, cause the computing device to:
at the time for the communication device to switch from the standby state to the active state, send, to the communication device, advertisement data that supplements the advertisement occurring during output of the content item.

11. The system of claim 7, the instructions, when executed by the one or more processors of the computing device, cause the computing device to:
at the time for the communication device to switch from the standby state to the active state, send, to the communication device, an instruction to illuminate one or more backlights of the communication device, wherein the one or more backlights indicate that the one or more microphones of the communication device are active.

12. The system of claim 7, wherein the communication device comprises at least one of a device configured to function as a two-way remote control or a mobile phone configured to control presentation of content.

13. A non-transitory computer-readable medium storing instructions that, when executed, cause:
based on detecting reception of a voice command via a microphone, sending, to a communication device, an instruction for the communication device to switch from a standby state to an active state, wherein the communication device is configured to send data to a computing device or receive data from the computing device during the active state; and
after sending the instruction for the communication device to switch from the standby state to the active state, receiving, from the communication device and during the active state, the voice command.

14. The computer-readable medium of claim 13, wherein the instructions, when executed, cause:
during the active state, sending, to the communication device, an indication of a future time for the communication device to switch from the standby state to the active state; and
after sending the indication of the future time for the communication device to switch from the standby state to the active state, sending, to the communication device, an instruction for the communication device to switch from the active state to the standby state.

15. The computer-readable medium of claim 13, wherein the instructions, when executed, cause:
during the active state, sending, to the communication device, supplemental advertisement data for display by the communication device, wherein the supplemental advertisement data corresponds to an advertisement occurring during output of a content item by the computing device.

16. The computer-readable medium of claim 13, wherein the communication device comprises at least one of a device configured to function as a two-way remote control or a mobile phone configured to control presentation of content.

17. A system comprising:
a communication device; and
a first computing device comprising:
one or more processors; and
memory storing instructions that, when executed by the one or more processors of the first computing device, cause the first computing device to:
based on detecting reception of a voice command via a microphone, send, to the communication device, an instruction for the communication device to switch from a standby state to an active state; and
after sending the instruction for the communication device to switch from the standby state to the active state, receive, from the communication device and during the active state, the voice command; and
wherein the communication device is configured to:
send data to a second computing device or receive data from the second computing device during the active state, and
receive the instruction.

18. The system of claim 17, wherein the instructions, when executed by the one or more processors of the first computing device, cause the first computing device to:
during the active state, send, to the communication device, an indication of a future time for the communication device to switch from the standby state to the active state; and
after sending the indication of the future time for the communication device to switch from the standby state to the active state, send, to the communication device, an instruction for the communication device to switch from the active state to the standby state.

19. The system of claim 17, wherein the instructions, when executed by the one or more processors of the first computing device, cause the first computing device to:
during the active state, send, to the communication device, supplemental advertisement data for display on a display of the communication device, wherein the supplemental advertisement data corresponds to an advertisement occurring during output of a content item by the second computing device.

20. The system of claim 17, wherein the communication device comprises at least one of a device configured to function as a two-way remote control or a mobile phone configured to control presentation of content.

* * * * *